(12) United States Patent
Bosisio et al.

(10) Patent No.: US 6,658,185 B2
(45) Date of Patent: Dec. 2, 2003

(54) OPTICAL FIBER CABLE WITH COMPONENTS HAVING IMPROVED COMPATIBILITY WITH WATERBLOCKING FILLING COMPOSITIONS

(75) Inventors: Claudio Bosisio, Brembate (IT); Antonio Zaopo, Milan (IT); Mauro Maritano, Monza (IT); Antonio Campana, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/079,602

(22) Filed: Feb. 22, 2002

(65) Prior Publication Data

US 2003/0049002 A1 Mar. 13, 2003

Related U.S. Application Data

(63) Continuation of application No. PCT/EP00/07170, filed on Jul. 26, 2000.
(60) Provisional application No. 60/151,067, filed on Aug. 27, 1999.

(30) Foreign Application Priority Data

Aug. 23, 1999 (EP) ............................. 99116488

(51) Int. Cl.$^7$ ................................. G02B 6/44
(52) U.S. Cl. ..................................... 385/109
(58) Field of Search ................. 385/100, 109; 428/383, 379, 401

(56) References Cited

U.S. PATENT DOCUMENTS

| | | | |
|---|---|---|---|
| 4,153,332 A | 5/1979 | Longoni | 350/96.23 |
| 4,741,592 A | 5/1988 | Secco et al. | 350/96.23 |
| 5,187,763 A | 2/1993 | Tu | 385/100 |
| 5,285,513 A * | 2/1994 | Kaufman et al. | 385/109 |
| 5,455,881 A | 10/1995 | Bosisio et al. | 385/100 |
| 5,574,816 A | 11/1996 | Yang et al. | 385/109 |
| 5,715,343 A | 2/1998 | Anelli et al. | 385/100 |
| 5,718,974 A * | 2/1998 | Kmiec | 174/113 R |
| 5,737,468 A * | 4/1998 | Sasai et al. | 385/105 |
| 5,761,362 A | 6/1998 | Yang et al. | 385/109 |
| 5,911,023 A * | 6/1999 | Risch et al. | 385/100 |
| 6,180,721 B1 * | 1/2001 | Rogestedt et al. | 174/102 R |
| 6,185,349 B1 * | 2/2001 | Dammert et al. | 385/100 |
| 6,258,885 B1 | 7/2001 | Heucher et al. | 524/484 |

FOREIGN PATENT DOCUMENTS

| | | |
|---|---|---|
| EP | 0 109 613 | 5/1984 |
| EP | 0 287 244 A1 | 10/1988 |
| EP | 0 541 007 A1 | 5/1993 |
| EP | 0 564 162 A1 | 10/1993 |
| EP | 0 811 864 | 12/1997 |
| EP | 0 969 301 A2 | 1/2000 |
| GB | 2 170 019 A | 7/1986 |
| WO | WO97/03124 | 1/1997 |
| WO | WO97/38424 | 10/1997 |
| WO | WO00/37556 | 6/2000 |

* cited by examiner

*Primary Examiner*—Javaid H. Nasri
(74) *Attorney, Agent, or Firm*—Finnegan, Henderson, Farabow, Garrett & Dunner, L.L.P.

(57) ABSTRACT

An optical fiber cable having improved compatibility with a waterblocking filling composition is provided. In particular, the optical fiber cable has a cable component, wherein an optical fiber can be housed, such as a buffer tube or a slotted core, made of a polyolefinic material having high compatibility with a waterblocking filler disposed therein. The cable component is manufactured by employing a suitable polyolefinic material, polyethylene in particular, having a density in the finished component of at least 0.940 g/ml, preferably of about 0.942 g/ml or higher, up to about, e.g., 0.975. The material preferably has a melt flow index (MFI) at 190 ° C. and 2.16 kg lower than about 3 and a shear sensitivity of the same, a shear sensitivity higher than about 40.

11 Claims, 5 Drawing Sheets

OPTICAL FIBER CABLE WITH COMPONENTS HAVING IMPROVED COMPATIBILITY WITH WATERBLOCKING FILLING COMPOSITIONS

CROSS REFERENCE TO RELATED APPLICATIONS

This application is a continuation of international application number PCT/EP00/07170, filed Jul. 26, 2000, and claims the priority to European Patent Application No. 99116488.0, filed Aug. 23, 1999, and the benefit of U.S. provisional application No. 60/151,067, filed Aug. 27, 1999, the contents of which are incorporated herein by reference.

BACKGROUND OF THE INVENTION

1. Field of the Invention

The present invention relates to an optical fiber cable having improved compatibility with a waterblocking filling composition. In particular, the present invention relates to an optical fiber cable comprising a cable component, wherein an optical fiber can be housed, such as a buffer tube or a slotted core, made of a polyolefinic material having high compatibility with a waterblocking filler disposed therein.

2. Description of the Related Art

Examples of structures of optical fiber cables known in the art are described for instance in U.S. Pat. No. 5,911,023 and comprise the multi-tube (also know as "loose tubes") structure, the monotube (or central loose tube) structure and the slotted core design structure.

According to the multi-tube structure, a number of buffer tubes containing one or more optical fiber (either as single fibers or in the form of bundles or ribbons of fibers) are disposed around a central element, which may be a strength member (e.g. made of fiberglass or polymeric coated steel wire) or a further buffer tube. Optical fibers or optical fiber ribbons are preferably loosely housed within the buffer tube, so to minimize stresses caused by elongation of the cable structure. The buffer tubes are tipically helical stranded around the central element with a continuous or with a S-Z (alternate hand) helix. One or more buffer tubes may be replaced in the configuration by one or more rods (typically of plastic material) to provide symmetry for fiber counts lower than that of a full fiber count cable. The buffer tubes are generally filled with a waterblocking material such as a gel or grease, which surrounds the optical fibers and prevents longitudinal propagation of water along the tube.

According to the central loose tube design, the optical fibers are disposed within a central polymeric tube which is generally filled with some type of waterblocking compound. In all of these structures, the buffer tube or core provides the primary structure to protect the thin optical fibers contained within.

According to the slotted-core design, a number of channels or slots forming a helical path are provided on the outer surface of polymeric rod centrally disposed within the cable structure. The optical fibers are disposed within such channels or slots which are generally filled with a waterblocking gel.

Typically the buffer tubes or core is jacketed with an additional protective layer.

Additionally reinforcing yarns or fibers as well as waterblocking materials in the form of gels or hot melts, water swellable powders, yarns, or tapes, and/or corrugated armor may be placed between the jacket and the inner cable layers.

As disclosed in U.S. Pat. No. 5,911,023, fiber optic buffer tubes or cores have been primarily made from "engineering resins" such as polybutylene terepthalate (PBT), polycarbonate (PC), a polyamide such as nylon-12, or some layered combination of the above. Generally, these materials have been chosen due to their high modulus and low CTE relative to other polymers.

In addition, U.S. Pat. No. 4,153,332 suggests using polyethylene or polypropylene as a material suitable for the manufacturing of stranded loose buffer tubes.

Furthermore, U.S. Pat. No. 5,574,816 suggests the use of polyolefin buffer tubes made of a nucleated copolymer of polyethylene and polypropylene.

As disclosed in U.S. Pat. No. 5,911,023, such nucleated copolymer of polyethylene and polypropylene should however possess a high melt flow index (MFI higher than about 3 g/10 min) in order to increase its processability at high speed line. According to the above cited patent, the presence of such nucleating agent results in a reduced post-extrusion shrinkage of the buffer tube and allows a more rapid development of a higher level of crystallinity within the polymer.

SUMMARY OF THE INVENTION

The Applicant has now observed that the compatibility of a cable component with the waterblocking filler can be substantially improved if said cable component is manufactured by employing a suitable polyolefinic material, polyethylene in particular, having a density in the finished component of at least 0.940 g/ml, preferably of about 0.942 g/ml or higher, up to about, e.g., 0.975 g/ml.

Applicant has found that such density can be obtained by using starting materials having a nominal density (i.e. as given on the data sheet of the material) of at least 0.950 g/ml or higher.

The Applicant has further observed that if such material is polyethylene having a nominal density higher than 0.950 g/ml, said material is capable of developing a relatively high cristallinity degree (higher than 60%), also if rapidly cooled from its molten state to ambient temperature (e.g. within 10 seconds), without any substantial addition of nucleating agent.

On the contrary, other polyolefins, such as polypropylene or copolimers ethylene-propylene, need the presence of a nucleating agent (e.g from 0.05 percent to 1 percent by weight, as mentioned in the above cited EP 890,860) in order to reach a sufficient cristallinity degree in such relatively short time.

The applicant has observed that with the polyethylenic materials of the present invention, the presence of such nucleating agent in the above amounts does not substantially increase the cristallinity degree of the extruded polymer.

It will be appreciated by those skilled in the art that by avoiding such nucleating agent into polymeric compositions, the manufacturing process of the cable component is rather simpler. As a matter of fact, if such nucleating agent is used, it should be very well dispersed into the polymeric matrix. However, in order to reach an acceptable degree of dispersion, it is not possible to introduce the nucleating agent and the polymer directly into the extruder as such, but a pre-mix of the two components should be separately prepared in advance. It can thus be appreciated that the above procedure disadvantageously introduces a further step in the manufacturing process.

In addition, the Applicant has observed that in order to further select suitable polyolefinic materials, particular attention should be paid to the melt flow index (MFI) of the material and to the shear sensitivity of the same, i.e. the ratio between the MFI measured at 190° C. and 21.6 kg and the MFI measured at 190° C. and 2.16 kg, according to ASTM method D1238.

One aspect of the present invention thus relates to an optical cable comprising a cable component made of extruded polyolefin material wherein the polyolefin material forming said component has a density of at least 0.940 g/ml or higher, preferably of at least 0.942 g/ml or higher. Preferably, said cable component is in contact with a waterblocking filling composition, said waterblocking filling composition being preferably a polyolefin oil based composition.

According to a preferred aspect, said cable component is made from a polyolefin material having a melt flow index at 190° C. and 2.16 kg lower than about 3 g/10 min, preferably lower than about 2 g/10 min.

According to a further preferred aspect, the ratio between the melt flow index at 190° C. and 21.6 kg and the melt flow index at 190° C. and 2.16 kg of said polyolefin material is higher than about 40, preferably higher than about 70.

Preferably, said polyolefin material is polyethylene.

In the present description, the term polyethylene is intended to comprise either homopolymers obtained by polymerization of ethylene monomer or copolymers obtained by copolymerization of ethylene with minor amounts (e.g. less than about 5% by mole with respect to the amount of monomers) of other unsaturated monomers, such as olefins (e.g. propylene, butene, isoprene, hexene), styrene, vinylacetate, ethylacrylate.

According to a preferred embodiment, said cable component is in contact with a waterblocking filling composition. In particular, said cable component can be a buffer tube comprising at least one optical fiber housed therein or a slotted core comprising at least one groove extending longitudinally along the outer surface of said core and at least one optical fibre housed within said groove, said at least one optical fiber being preferably immersed into a waterblocking filling composition in contact with said cable component.

According to a preferred embodiment, said waterblocking filling composition contacted with said polyolefin cable component comprises a polyolefin base oil, said polyolefin base oil being preferably an internal polyolefin.

According to a preferred aspect of the present invention, the polyolefin material forming said cable component has a density of 0.950 g/ml or higher when subjected to a natural cooling from its molten state.

Preferably said polyolefin material shows a solubility in n-heptane at 85° C. after 24 hours of less than about 2%.

Preferably, said polyolefin material shows a weight increase of less than 10%, preferably of less than about 8% when contacted at 85° C. with a polyolefinic oil having a kinematic viscosity of about 30 cSt at 40° C., a viscosity index of about 128 and a weight average molecular weight in the range from approximately 400 Dalton to approximately 600 Dalton.

DRAWINGS

The present invention will be more clearly understood from the following detailed description, with reference to the attached drawings, in which.

DETAILED DESCRIPTION OF THE INVENTION

Figure 1:
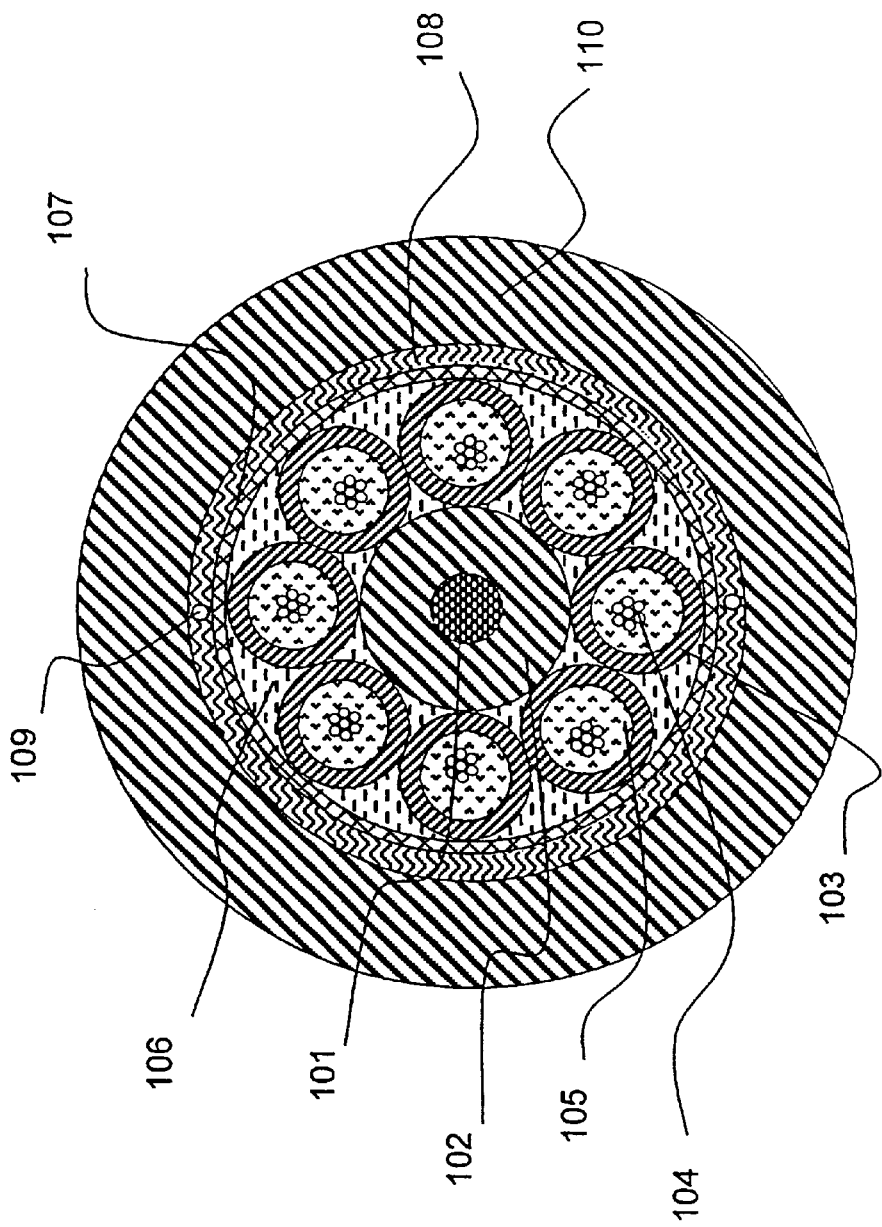
FIG. 1 shows schematically a cross-section of an optical fibre cable of the multi-tube type with a central support, according to the invention.

According to the present invention, optical cable components having improved compatibility with the grease-like fillers typically employed in such cables are provided. Such grease-like fillers are also known as "waterblocking fillers", as they are generally provided in the cable structure in order to limit or block the longitudinal flow of water accidentally penetrated inside the cable.

The composition of known fillers typically comprises a base oil, for example of the silicone, mineral (naphthenic or paraffin) or synthetic type (polyolefinic oil). This base oil typically requires the addition of a "viscosity improver" such as an elastomeric polymer with a low glass transition point which, by imparting a higher viscosity to the composition, improves its performance as a filling material. The filler composition may also contain an antioxidant and a thickening/thixotropic agent, for instance silanized pyrogenic silica.

There are various known types of cable comprising suitable housings for the optical fibers, said housings being filled with a filling composition.

For example, U.S. Pat. No. 5,455,881 describes an optical fibre cable comprising, in a suitable housing, the optical fibers embedded in a composition capable of protecting the fibers from phenomena of attenuation, in which the said composition comprises a hydrocarbon compound (e.g. polyisobutylene), a catalyst and a thixotropic thickener such as silica.

Another example of a filling composition is disclosed in patent application EP 811864, which describes a composition for fillers comprising a mineral oil or a polyalphaolefin as the base oil, a block copolymer, an anti-oxidant and optionally a stabilizer of the "metal deactivator" type.

Other examples of optical cables with known fillers are disclosed in U.S. Pat. Nos. 5,285,513 and 5,187,763 and in the patent EP 541007.

A further filler suitable for optical cables is disclosed in European Patent application no. 99EP-109613, filed by the Applicant on May 14, 1999. Such filler composition comprises an internal polyolefin as the base oil, in an amount of e.g. from about 45% to about 95% by weight of the total composition, said polyolefin being a mixture of oligomers (dimers, trimers, tetramers and low amounts of higher oligomers) produced by polymerization of mixtures of unsaturated monomers having from 10 to 20 carbon atoms and a double bond randomly distributed along the hydrocarbon chain. Said internal polyolefins preferably have a weight average molecular weight in the range from approximately 400 to approximately 600 dalton; a kinematic viscosity in the range from 15 to 400 mPa·s at 40° C. and in the range from 1 to 40 mPa·s at 100° C.; a pour point in the range from −100° C. to −40° C.; an index of viscosity preferably lying in the range from approximately 120 to 160; a density, measured at 15° C., in the range from approximately 0.820 g/ml to approximately 0.835 g/ml. Examples of such polyolefins are those marketed by MixOil-Enichem Augusta under the trade names MX 2104, MX 2106 and MX 2108. The filler composition disclosed in the co-pending European Patent application no. 99EP-109613 can advantageously further comprise mineral oils, in particular refined naphthenic oils (e.g. Nytex 800 and Nytex 810 and Nyflex 800 and Nyflex 810, manufactured by Nynas) which may partially replace the internal polyolefins in the filling mixture. Viscosity improvers (e.g. elastomeric block copolymers such as Kraton G1701 and Kraton G1702 manufactured by Shell Chemical), antioxidants (e.g. Irganox 1010, Irganox 1076, Ciba-Geigy) and thixotropic agents (e.g. pyrogenic silica) may also be added to the composition.

The Applicant has now found that by using a suitable polyolefinic material, preferably polyethylene, having a nominal density higher than about 0.950 g/ml, for manufacturing those cable components which are subjected to undergo to a physical contact with the above filling compositions, the compatibility of such components with such filling compositions can be substantially improved.

Examples of cable components which can be contacted with such filling compositions are, for instance, buffer tubes or slotted cores, as illustrated in detail with reference to the accompanying drawings.

The cable shown in FIG. 1 has in its radially innermost position a reinforcing element (101), typically made from glass-fibre reinforced plastic, coated with a layer (102) of polymeric material, for instance a polyolefin, polyethylene in particular, according to the present invention. The cable has one or more plastic tubular elements (103) ("buffer tubes") which can advantageously be made from the selected polyolefin material according to the invention, said tubes comprising a number of optical fibers (104) which are embedded in a filling material (105), such as those previously mentioned.

The optical fibers can be, for example, single-mode fibers, multi-mode fibers, dispersion-shifted (DS) fibers, non-zero dispersion (NZD) fibers, or fibers with a large effective area and the like, depending on the application requirements of the cable. They are generally fibers with an outside diameter usually of between 230 and 270 $\mu$m.

The filling composition typically has a viscosity sufficiently low to be easily introduced into the buffer tubes during the manufacturing process and to allow a substantially free relative movement of the fibers inside the tube but sufficiently high in order to oppose a sufficient physical barrier to the longitudinal flow of water accidentally penetrated inside the tube. Typically, said jelly-like material will thus have a kinematic viscosity (determined using a Rheomat 115 Contraves viscometer at a shear rate of 1.56 sec$^{-1}$) of from about 50 to about 220 Pa·s, preferably of from about 60 to about 100 Pa·s. Examples of filling compositions suitable for being used as water-blocking filler inside the above buffer tubes are those mentioned previously.

The number of tubular elements (103) present in the cable (which may also be arranged on several superposed layers) and the dimensions of these tubular elements depend on the intended capacity of the cable, as well as on the conditions under which this cable will be used. For example, six, eight or more tubular elements, arranged in one or more layers (for example up to 48 tubes), can be disposed around the central element.

The tubular elements (103) are disposed in a helical lay around the central member, said lay being either a continuous helix or an open helix obtained by alternate (S-Z) stranding of the tube. If desired, one or more tubes may be replaced by one or more rods, in order to preserve the symmetry of the helical configuration in case the fiber count is lower than the full fiber count. Alternatively, the central element can be replaced by a further tubular element as those previously mentioned, apt to contain optical fibers.

The interstices (106) between the buffer tubes can also be filled with a filling compositions such as those previously mentioned or, preferably, with a composition having a higher viscosity.

The viscosity of said second jelly-like material can be of from about 200 to about 500 Pa·s, preferably of from about 300 to 400 Pa·s. Suitable jelly like materials are commercialized, for instance, by Amoco (CI500®) or by BP (NAPTEL® 947). Optionally, said jelly-like compositions for filling interstices (106) can be provided with hydrogen adsorbing means such as, for instance, the compositions disclosed in U.S. Pat. Nos. 4,741,592 and 5,455,881. For further improving the water blocking properties of said filling material, a water swellable powder (i.e. a compound having the property of gelling/swelling upon water absorption), such as sodium polyacrylate or polymethacrylate, can be advantageously added to the jelly-like composition. The amount of said water-swellable powder may be in the range of from about 20% to about 70% by weight of the total composition, preferably in an amount of about 50%. Examples of suitable jelly-like material containing water swellable powders for filling interstices (106) are disclosed, for example, in U.S. Pat. No. 5,715,343.

Stranded tubes are generally bound together with a polymeric yarn or tape (not shown), e.g. a polyester or polypropylene yarn, in order to held them firmly in their helical configuration during manufacturing processes.

A further polymeric tape (not shown) can be optionally wound with overlapping around the stranded buffer tubes in order to allow an effective containment of the interstitial water-blocking filler. Such polymeric tape, for instance polyester (e.g. Mylar®), has a thickness of about 25 to 50 $\mu$m and can be helical wound around the stranded buffer tubes with a overlap of about 3 mm.

A water-blocking (or water swellable) tape (107) can be wound around the whole structure. Such water-blocking tapes generally comprise a polymeric base tape on the surface of which a superabsorbent swellable material (e.g. polyacrylate or polymethylmethacrylate) in the form of powder is chemically or thermally fixed. The polymeric tape can be either a single tape, for instance of nonwowen material (e.g. polyester) onto which the superabsorbent material is fixed, or a double layer of polymeric film, for instance one layer of nonwowen material and the other of laminated material (e.g. polyethylenterephtalate) where the superabsorbent powder is disposed inbetween them. Examples of suitable water-swellable tapes are those commercialized by Freudenberg under the trademark Viledon®, e.g. Viledon® K3415, K3416, K3417 or K3516.

The stranded tubes can then be wrapped by a reinforcing layer (108), e.g. made of aramidic yarns (Kevlar®) or glass thread, optionally containing two sheath cutting threads (109) disposed longitudinally with respect to the cable. An outer polymeric layer, e.g. of polyolefin (for instance according to the present invention), is then disposed to surround the cable structure. Optionally, a metal tape (not shown), preferably corrugated, can be disposed between the outer sheath (110) and the reinforcing layer.

Figure 2:
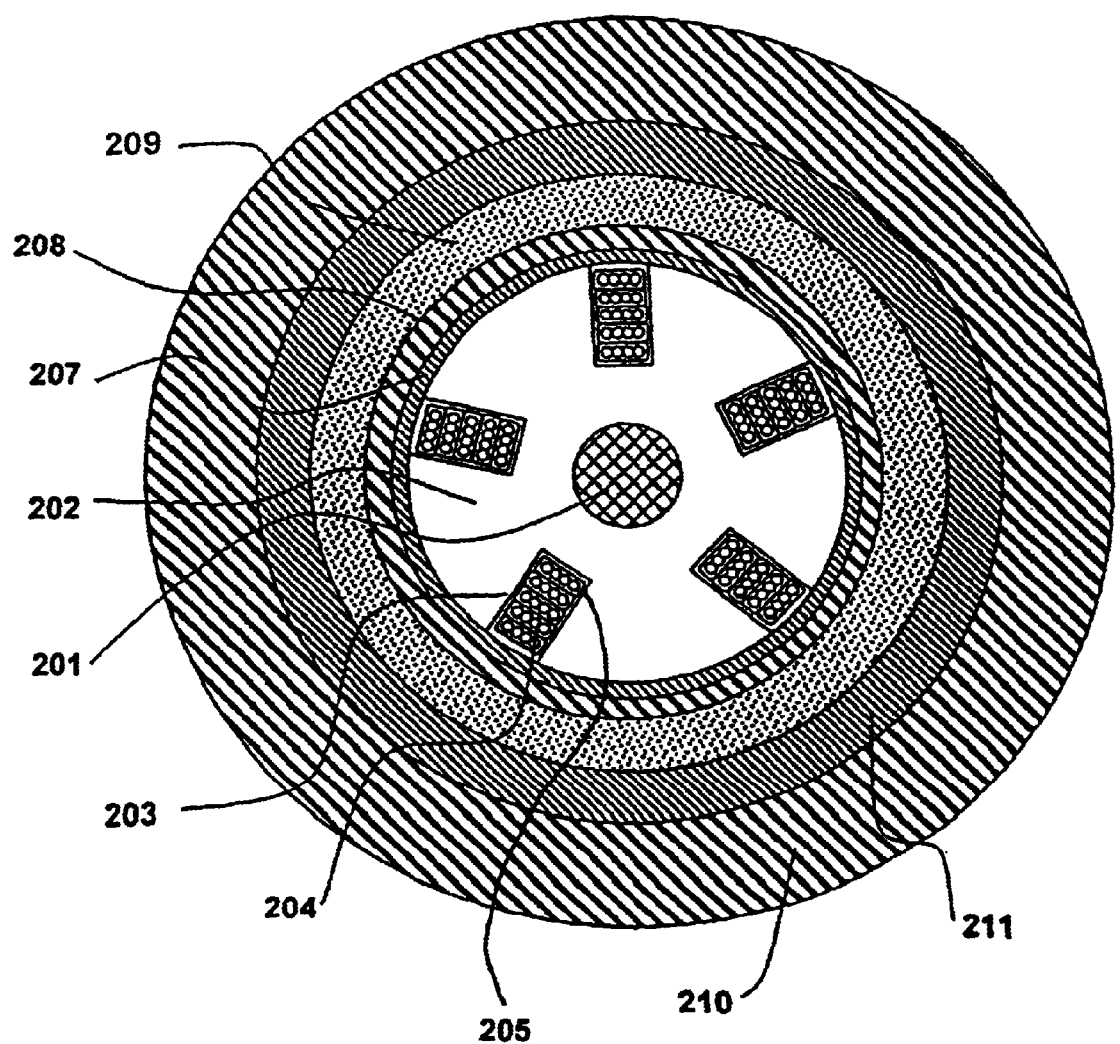
FIG. 2 shows schematically a cross-section of another optical fibre cable according to the invention, with a slotted core.

FIG. 2 shows another example of an optical fibre cable according to the invention, having in its radially innermost position a reinforcing (201) element on which a slotted core (202) is extruded, said slotted core being advantageously made from a polyolefinic material according to the invention. Grooves (203) are formed longitudinally on the outer surface of said core, which grooves extend either as a continuous helix or with an S-Z configuration along the whole outer surface of the core. The grooves (203) are filled with a filler (204) as the one indicated previously, and optical fibers in the form of ribbons (205) are embedded therein. The slotted core (202) is then wrapped by a containment tape (not shown in FIG. 2), e.g. of polyester, surrounded by a waterbloking (207) tape as the one indicated previously. A polymeric jacket (208), for instance of polyurethane or of a polyolefin material according to the present invention, can be disposed to surround the wrapped slotted core. A reinforcing layer (208), e.g. made of aramidic yarns (Kevlar®) or glass thread, can be disposed to surround said polymeric sheath (208), optionally containing two sheath cutting threads (209) disposed longitudinally with respect to the cable. An outer polymeric layer, e.g. of a polyolefin (for instance according to the present invention), is then disposed to surround the cable structure. Optionally, a metal tape (211), preferably corrugated, can be disposed between the outer sheath (210) and the reinforcing layer.

Figure 3:
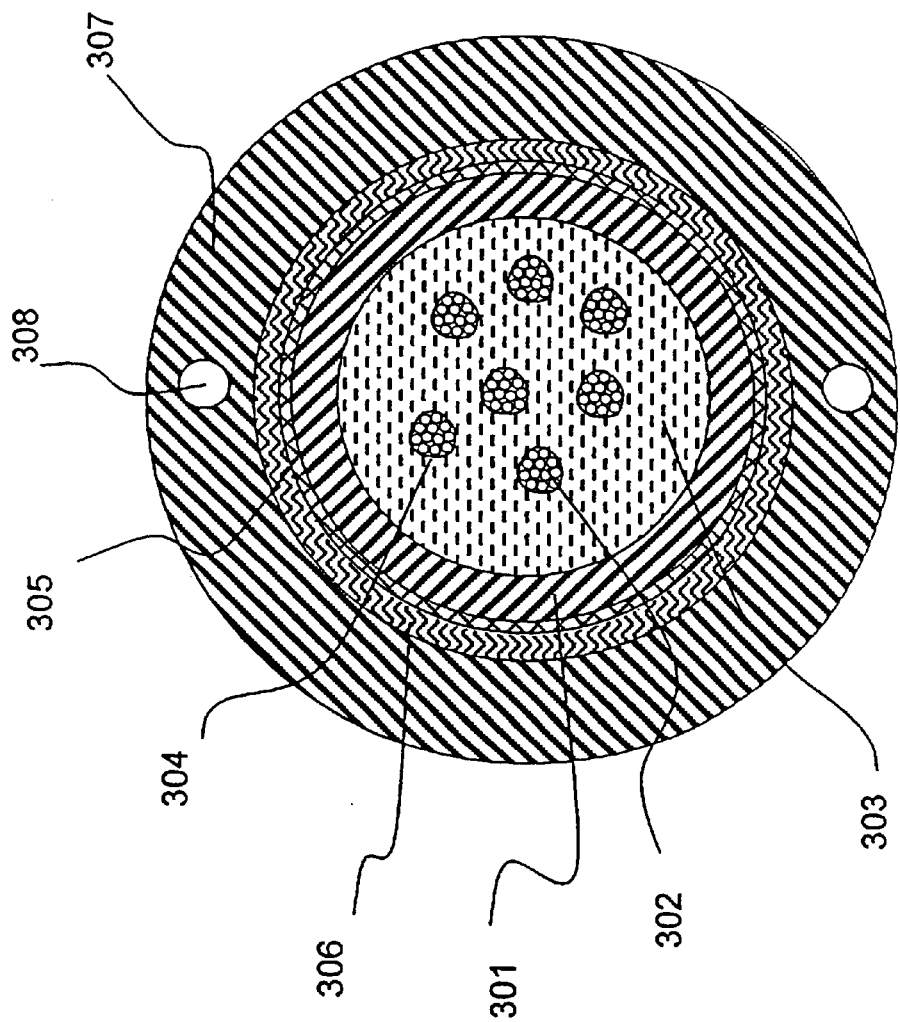
FIG. 3 shows schematically a cross-section of an optical fibre cable of the central loose tube type according to the invention.

FIG. 3 shows a cross-sectional view of an optical fibre cable comprising a central plastic tube (301) which can advantageously be made from a polyolefinic material according to the invention, said tube containing a number of optical fibers (302) which are preferably disposed loosely in a filling material (303) as previously mentioned. According to this alternative embodiment, groups of e.g. twelve optical fibers can be grouped into sub-units and enveloped by a thin layer of a low tensile modulus polymeric material (e.g. polyvinylchloride, ethylene-vinylacetate polymer, polyethylene or polypropylene) to form a sub-module (304). Advantageously, a polyolefin material according to the present invention can be used for forming said sheath. The polymeric sheath can be colored in order to facilitate the identification of the fibers.

The number of optical elements (304) present (which may also be arranged on several layers) and the dimensions of these elements depend on the intended capacity of the cable, as well as on the conditions under which this cable will be used. For example, both cables with a single optical element (304) and cables with six, eight or more optical elements, arranged in one or more layers (for example up to 48 tubes), are envisaged.

The optical elements may be arranged into the inner tube (301) in a continuous or in an open helix pattern around the axis of the cable.

Around the buffer tube (301) a water blocking tape (305) as previously described can wound in a helical lay, thus forming the optical core. A reinforcing layer (306) can be disposed around the waterblocking tape and an outer polyethylene sheath (307) is then disposed to surround the cable structure.

One or more reinforcing members (308) arranged longitudinally along the cable are inserted in the thickness of the said outer tubular sheath (307). In one preferred embodiment, as illustrated in FIG. 3, two reinforcing members (308) are present, advantageously arranged diametrically opposite each other. In addition, a reinforcing member can be alternatively or additionally placed inside the inner tube (301) in an axial position.

These members are preferably completely immersed in the said sheath and preferably consist of reinforcing rods of high-strength material, typically between 0.5 and 2.5 mm in size. Said reinforcing members can be made of a composite material, such as glass resin or reinforced carbon fibre resin or aramide yarns (Kevlar®), or alternatively of a metallic material such as steel and the like.

In one specific embodiment, the tube (301) can be omitted and a single tubular sheath (307) made from a polyolefin material according to the invention, can carry out the twofold function of an outer protective sheath and an inner tube.

Figure 4:
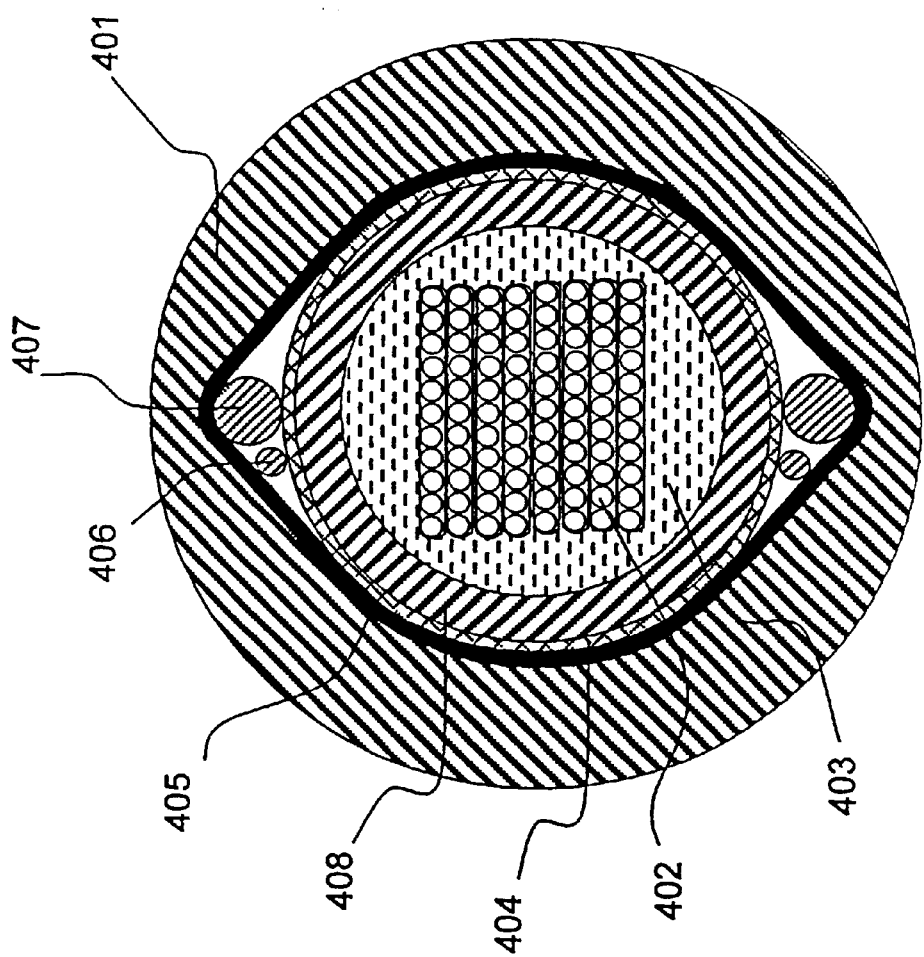
FIG. 4 shows schematically a cross-section of an optical fibre cable of the central loose tube type with ribbons of fiber, according to the invention.

FIG. 4 shows another example of an optical fibre cable comprising a central plastic tube (401) as above, in which optical fibre ribbons (402) are housed, embedded in the filling material (403). The central tube (401) is wrapped with a water swellable layer (404) and with a containing tape (405) typically made from polyester, between which tapes are contained a sheath cutting threads (406) and reinforcing rods (407). An outer polymeric layer (408), e.g of polyolefin, is disposed to surround the above structure.

In relation to specific requirements, further protective layers, for example further metal or polymer layers or metal armoring, can also be present, both inside and outside the above structure described.

The Applicant has now found that if one or more of the above mentioned cable components are made from a polyolefinic material, preferably polyethylene, showing a density higher than about 0.940 g/ml when extruded into said cable component, the compatibility of such component with the filling material in contact therewith is substantially increased.

The Applicant has observed that the density of the polyolefinic material forming the cable component may depend from the cooling conditions to which the material is subjected. In particular, if the material is subjected to rapid cooling from its molten state, e.g. when the material is extruded into the cable component and suddenly cooled, the final density of the material can be relatively lower than the original nominal density of the raw material. Applicant has observed that the starting polyolefinic material should thus preferably have a nominal density of at least 0.950 g/ml or higher, in order to obtain the suitable density of the material forming the final cable component. As a matter of fact, the faster the cooling of the polyolefin material, the lower the density of the polymeric material in the component, as shown in the following table 1.

TABLE 1

| Variation of the density of the polyehylenic materials at different cooling conditions | | | | | |
|---|---|---|---|---|---|
| Material | 1 | 2 | 3 | 4 | 5 |
| Nominal density (g/ml) | 0.957 | 0.958 | 0.961 | 0.960 | 0.945 |
| Density upon slow cooling (g/ml) [1] | 0.960 | 0.962 | 0.965 | 0.969 | 0.948 |
| Density upon rapid cooling (g/ml) [2] | 0.943 | 0.943 | 0.945 | 0.941 | 0.939 |
| Density of an extruded buffer tube (g/ml) [3] | 0.944 | 0.944 | 0.945 | 0.945 | 0.938 |

[1] The density is measured on the material cooled at ambient temperature over one day after being heated up to its melting temperature
[2] The density is measured on the material then cooled in water at 15° C. after being heated up to its melting temperature.
[3] The density is measured on a tube of the plastic material, extruded at a speed of 150 m/min and cooled in a water bath at a temperature of from 30° C. to 15° C.

The material reported in table 1 are all commercially available polyethylenes, as listed hereinafter:
1=Finathene SR572 (Fina)
2=Eraclene BC 92 (Polimeri Europa)

3=Eraclene BF 92 (Polimeri Europa)

4=Eraclene MP 90 (Polimeri Europa)

5=DGDK 3364 (Union Carbide)

The density of the materials in table 1 is measured according to ASTM standard D792.

As shown in table 1, the nominal density of a polymer is approximately equal to the density of the materials subjected to a slow cooling, while the density of the extruded polymers is approximately equal to the density of the material subjected to a rapid cooling.

According to the present invention, cable components made of a polyolefin material having a density of at least 0.940 g/ml, or higher, are particularly suitable for being placed in contact with the gel-like materials typically employed as fillers in optical cables. On the other side, polyolefin materials having a density lower than 0.940 g/ml when extruded into the above cable components show a poor compatibility with said waterblocking filling materials.

Applicants believes that such improved behavior of said materials may reside in the higher cristallinity of the same (higher than about 60%), with respect to the low cristallinity of the lower density materials.

Applicant has further noticed that the differences shown above as regards to the density of the polymer, due to the different ways the material is cooled, may result in similar differences between the cristallinity of the polymers, as outlined in the following table 2. The cristallinity of the materials of table 2 is measured using a Mettler TA-4000 DSC (Differential scanning calorimeter). The heat of fusion of the extruded material and of the slow cooled material have been determined according to ASTM D3417 during the following thermal cycle:

a) heating from 25° C. to 180° C. at 10° C./min, b) holding for 10 min at 180° C., c) cooling from 180° C. to 25° C. at 10° C./min d) heating from 25° C. to 180° C. at 10° C./min.

The level of cristallinity is considered proportional to the heat of fusion determined by DSC, using the value of 290 J/g as the conversion factor corresponding to the theoretical heat of fusion of a 100% crystalline polyethylene (see also the reference book "Polymer Handbook, J. Brandrup and E. H Immergut, 1999, $4^{th}$ ed., Wiley Interscience ed.") Thus:

$$\% \text{ of cristallinity} = \frac{\text{measured heat of fusion}}{290} \cdot 100$$

The area generated by the curve during the first heating cycle (a) corresponds to the heat of fusion of the extruded polymer, while the area generated by the curve during the second heating cycle (d) corresponds to the heat of fusion of the slowly cooled polymer.

TABLE 2

Cristallinity of polyethylenic materials under different colling conditions (DSC)

| Material | 1 | 2 | 3 | 4 | 5 |
|---|---|---|---|---|---|
| % of cristallinity on extruded material | 62.7 | 64 | 66 | 67.4 | 58 |
| % of cristallinity upon slow cooling | 72 | 74 | 75 | 83 | 64 |

As apparent from table 2, the cristallinity of the polymers is slightly reduced when the material is subjected to a rapid cooling (e.g. during manufacturing upon extrusion of the cable components) with respect to the cristallinity measured onto a cable component subjected to slow cooling (e.g. upon natural cooling in air).

The Applicant has further noticed that among the polyolefin materials having a nominal density higher than about 0.950, those having a Melt flow index (MFI) at 190° C. and 2.16 kg lower than about 3 can advantageously be used. In particular, preferred materials are those having a MFI lower than about 2, particularly preferred being those having a MFI lower than about 1. The MFI (expressed in g/10 min) is the melt flow index of the material measured at a temperature of 190° C. and a weight of 2.16 kg, according to ASTM method D1238.

As a matter of fact, the Applicant has observed that buffer tubes made of a polyethylenic material having a MFI higher than about 5 and filled with a polyolefin-oil based filling composition show a rather poor behavior upon aging.

In addition, among those materials having a MFI lower than about 3, particularly preferred are those having a shear sensitivity higher than about 40, preferably higher than about 70, wherein the shear sensitivity (SS) is the ratio between the MFI of the material measured at 190° C. and 21.6 kg and the MFI of the material measured at 190° C. and 2.16 kg according to ASTM method D1238.

The Applicant has in fact observed that, due to the high melt viscosities at the high shear rates associated with high line speeds (e.g. 150 m/min), if the shear sensitivity of a polyethylenic material having a MFI lower than about 3 is lower than about 40, the extrusion process is relatively cumbersome and may result in remarkable irregularities of the extruded tube. On the other side, if such shear sensitivity value is sufficiently high, the extrusion process, also at the high speed rates, can be accomplished easier. In particular, the Applicant has observed that higher shear sensitivity values should be associated to lower MFI values. For instance, an indicative correlation between MFI and shear sensitivity of the materials, for extrusion carried out at a speed rate of about 150 m/min, is given in the following:

| MFI (190° C., 2.16 Kg) | Shear sensitivity |
|---|---|
| ≦0.2 | ≧90 |
| ≦0.8 | ≧70 |
| ≦1.5 | ≧50 |
| ≦3.0 | ≧40 |

Upon reducing the speed rate of the extrusion line, the above values of shear sensitivity will be correspondingly reduced.

Although not wishing to be bound to any particular theory, the Applicant suggests the following interpretation of the observed results.

While the melt flow index is correlated to the molecular weight of the material, (in general, lower MFI values correspond to higher molecular weights, and vice versa) the shear sensitivity is an indication of the molecular weight distribution of the material (in general, higher values of shear sensitivity correspond to broader MW distributions, and vice versa). This happens in particular for those material having a low MFI and a low value of shear sensitivity (i.e. relatively narrow molecular weight distribution). However, the applicant has observed that by using low MFI polymers (e.g. MFI lower than 1 g/10 min) having a relatively high value of shear sensitivity (e.g. higher than about 80), i.e. with a relatively large distribution of the molecular weights, the presence of the low molecular weight fractions results in better processing properties of the melt.

Figure 5:
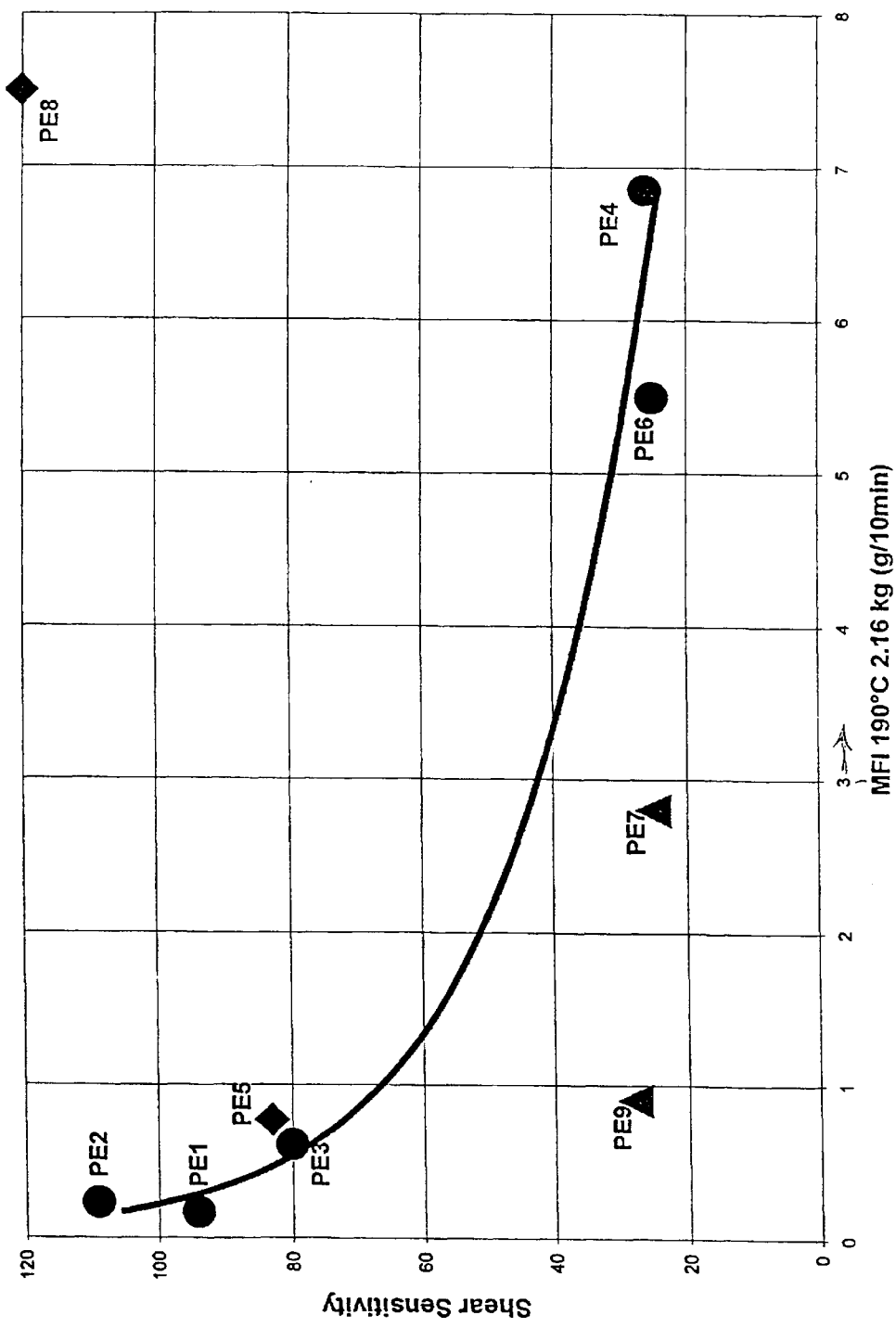
FIG. 5 represents the MFI values of some polyethylenic materials vs. the shear sensitivity of the same

The above observations can be summarized by FIG. 5, showing the graphic correlation between the MFI and the shear sensitivity of polyethylenic materials.

As shown in FIG. 5, the higher the value of MFI, the lower the shear sensitivity value. Materials lying close to the curve or in the area above it are considered as having good processability performances.

As mentioned previously, a cable component according to the present invention is particularly suitable for being contacted with hydrocarbon oil based filling compositions. Typically, said filling compositions comprise from about 50% to about 95% of their weight of said hydrocarbon base oil, in general of the mineral (naphthenic or paraffin) or of synthetic type (polyolefinic oil).

The Applicant has observed that, while other constituents of the filling compositions are relatively inert towards the polyolefinic materials forming a cable component which comes into contact with the filling composition, these hydrocarbon base oils may nevertheless cause a partial dissolution of such materials.

As observed by the Applicant, the dissolution of such polyolefinic materials into the filling composition may cause an undesired increase of the viscosity of the filling composition. As a matter of fact, if the filling composition becomes too viscous (e.g. with a viscosity higher than about 180–200 Pas), optical fibers may be prevented from their free movement inside the cable structures and microbending phenomena may thus arise, causing attenuation of the transmitted signal. According to the present invention, a polyolefin material forming a cable component should thus show a reduced solubility in the hydrocarbon base oils of the waterblocking filling compositions. In particular, Applicant has found that materials particularly suitable for being contacted with such hydrocarbon base oil are those showing a solubility of less than about 2% after 24 hours in n-heptane at 85° C.

Further from being partially dissolved by the hydrocarbon base-oils of the filling compositions, the polyolefin materials of the cable component may swell upon contact with such oils, thus including a certain amount of said oils within their polymeric matrix. As observed by the Applicant, the inclusion of the base-oil into the polymeric matrix may determine two main drawbacks, i.e.:

a further increase in the viscosity of the filling composition, due to reduction of the fluid portion (oil) of the composition;

a worsening of the mechanical properties of the polyethylenic material.

According to the present invention, a polyolefin material forming a cable component should thus show a reduced swelling when contacted with said base-oils. In particular, a polyolefin material extruded into a cable component according to the present invention should show a weight increase lower than about 10%, preferably lower than about 8% when contacted at 85° C. with a polyolefinic oil having a kinematic viscosity of from about 30 cSt at 40° C., a viscosity index of about 128 and a weight average molecular weight in the range from approximately 400 to approximately 600 dalton.

In order to better understand the subject invention, the following examples are given. In the examples, reference will be made to the following polyethylenic materials:
PE1=Finathene SR572 (Fina)
PE2=Eraclene BC 92 (Polimeri Europa)
PE3=Eraclene BF 92 (Polimeri Europa)
PE4=Eraclene MP 90 (Polimeri Europa)
PE5=DGDK 3364 (Union Carbide)
PE6=Eraclene MM84 (Polimeri Europa)
PE7=Eraclene ML 74 (Polimeri Europa)
PE8=Riblene MP30 (Polimeri Europa)
PE9=Hostalen GF 7750 M2 (Elenac-Hoechst)

Table 3 shows the main characteristics of such materials.

TABLE 3

Characteristics of the employed polyethylenes

| Material | PE1 | PE2 | PE3 | PE4 | PE5 | PE6 | PE7 | PE8 | PE9 |
|---|---|---|---|---|---|---|---|---|---|
| Nominal density (g/ml) | 0.957 | 0.958 | 0.961 | 0.960 | 0.945 | 0.956 | 0.951 | 0.925 | 0.956 |
| Density after rapid cooling (g/ml) | 0.943 | 0.943 | 0.945 | 0.941 | 0.939 | — | — | — | — |
| Density after slow cooling (g/ml) | 0.960 | 0.962 | 0.965 | 0.969 | 0.948 | — | — | — | — |
| MFI$_A$ (190° C., 2.16 kg) (g/10 min) | 0.17 | 0.23 | 0.61 | 7.0 | 0.77 | 5.5 | 2.8 | 7.5 | 0.9 |
| MFI$_B$ (190° C., 21.6 kg) (g/10 min) | 16 | 25 | 49 | 180 | 64 | 137.5 | 70 | n.d. | 25.2 |
| MFI$_B$/MFI$_A$ | 94 | 109 | 80 | 26 | 83 | 25 | 25 | n.d. | 28 |

Notes:
a) Density of the materials were measured as indicated previously with reference to table 1.
b) MFI were measured according to ASTM method D1238
c) n.d. = value not detectable: the MFI$_B$ of the material is not detectable (higher than 900 g/10 min) due to the extremely low viscosity of the material.

As apparent from table 3, materials PE5 and PE8 have a nominal density lower than 0.950 g/ml, while for PE5 a density lower than 0.940 g/ml has been determined on the material subjected to a rapid cooling.

EXAMPLE 1

Solubility of polyethylenic materials in base-oils

The polyethylenic materials listed in table 3 have been tested as raw materials (in pellets) for their solubility into the base-oils of the filling materials.

The solubility of polyethylenic materials in pellets has been tested in n-heptane at a temperature of 85° C., which is the reference temperature for accelerated aging tests of cable.

N-heptane, although not being a base-oil commonly used in optical cable filling composition, has been chosen for its easy availability and similarity with the polyolefin base-oils generally employed. Solubility tests performed with n-heptane are also more easy to be carried out as said solvent boils at lower temperature (about 98° C.) with respect to polyolefin oils.

For determining the solubility of the polyethylenic material, 30 g of the material in pellets were extracted in a modified Soxhlet apparatus at 85° C. for 24 hours. The modification of the Soxhlet apparatus consisted in separating the extraction chamber (total volume of 280 ml), wherein the polymeric material is placed, from the boiling flask where the solvent is placed, in order to avoid overheating of the polymeric material. In this manner, the boiling flask can be kept at a temperature apt to let the solvent boil (about 100° C.), without damaging the polymeric material to be tested. The produced vapor of solvent were then condensed and sent to the separated extraction chamber, which was kept at a temperature of about 85° C. by using an external thermo-stated fluid. The solution from the extracting chamber (solvent and extracted polymer) was then recycled to the boiling flask. The recycling conditions were set so as to allow a complete turnover of the volume of solvent contained into the extracting chamber in a period of about 15 minutes.

At the end of the 24 hours, the solution contained into the boiling flask was recovered into a cup, dried and the weight of the residual solid was measured.

Table 4 shows the results of the test.

TABLE 4

Solubility of the raw materials in n-heptane

| | PE1 | PE2 | PE3 | PE4 | PE5 | PE6 | PE7 | PE8 | PE9 |
|---|---|---|---|---|---|---|---|---|---|
| Solubility % | 1.56 | 1.32 | 1.33 | 0.50 | 3.0 | 0.90 | 0.74 | 100 | 0.37 |

As shown in table 4, material PE8 has been completely dissolved in n-heptane, while material PE5 shows a relatively higher solubility with respect to the other tested materials.

According to what observed by the Applicant, materials showing in the above test a solubility in n-heptane lower than about 2% are particularly suitable for manufacturing optical cables components which may be subjected to contacts with the oil-based filling compositions of the cable. On the other side, materials having a solubility of about 3% or higher have shown to be less suitable, as the amount of extracted polymeric material would tend, upon aging, to undesirably increase the viscosity of the filling composition. It can be appreciated that these latter materials, PE5 and PE8, have a nominal density higher than 0.950 g/ml.

EXAMPLE 2

Swelling of polyethylenic materials in base-oils

In order to determine the tendency to swell of the tested materials, a number of plates have been manufactured starting from the raw materials in pellets.

A first plate (150×150×3 mm) of each material was obtained by molding the raw material at 190° C. The molded plate was allowed to slowly cool in the mold, in order to obtain a material with a density substantially equal to the nominal one. Five smaller plates (38×13×3 mm) were then obtained from each of the above plates and weighted.

The swelling of the so obtained plates has been tested with respect to the following base-oils:

MX 2106® (Mixoil-Enichem Augusta);

Nesbase® 2006 (Nynas);

Nyflex® 810 (Nynas).

MX® 2106 is an internal polyolefin oil having a kinematic viscosity of from about 30 cSt at 40° C., a viscosity index of about 128 and a weight average molecular weight in the range from approximately 400 Dalton to approximately 600 Dalton. Nesbase® 2006 is a polyalphaolefin oil with physical properties similar to the above internal polyolefin, apart a viscosity index of about 138. Nyflex® is a naphtenic oil.

The plates were thus immersed at 85° C. into an amount of oil corresponding to about seven times the weight of the plates, and swelling of the plates was measured by determining the weight change (in percentage) of the plates after 7 and after 15 days. Each test has been repeated on five different plates, thus obtaining a mean swelling value of the material in the different test conditions.

Table 5 shows the results of the tests.

TABLE 5

Swelling (weight increase) of polyethylenic materials upon contacting with base-oils

| | PE1 | PE2 | PE3 | PE4 | PE5 | PE6 | PE7 | PE8 | PE9 |
|---|---|---|---|---|---|---|---|---|---|
| % swelling in MX2106 after 7 days | 7.40 | 5.90 | 4.77 | 6.14 | 22.09 | — | — | — | — |
| % swelling in MX2106 after 15 days | 7.56 | 5.96 | — | 6.31 | 21.29 | — | — | — | — |
| % swelling in Nesbase 2006 after 7 days | 6.33 | 6.10 | 3.62 | 5.64 | 13.76 | — | — | — | — |
| % swelling in Nesbase 2006 after 15 days | 6.73 | 6.50 | — | 5.88 | 13.99 | 7.20 | 6.50 | 33.10 | 5.90 |
| % swelling in Nyflex 810 after 7 days | 29.78 | 31.67 | 10.96 | 12.62 | dissolved | — | — | — | — |
| % swelling in Nyflex 810 after 15 days | 25.23 | 27.43 | — | 11.58 | dissolved | — | — | — | — |

As apparent from table 5, polymeric materials PE5 and PE8, with a nominal density (or a density measured upon slow cooling) lower than 0.950 g/ml, show relatively higher swelling values than other materials having a density higher than 0.950 g/ml. As mentioned above, these higher swelling values, further to determine an increase in the final viscosity of the filling composition may also impair the mechanical properties of the polyolefinic material forming the cable component.

In particular, materials showing a weight increase lower than about 10%, preferably lower than about 8% when contacted at 85° C. with the above polyolefinic oils are particularly suitable for being formed into a cable component according to the present invention.

As reported in table 5, the same materials show a relatively higher weight increase in naphtenic oils (Nyflex®). Nevertheless, the compatibility of these materials in naphtenic oils is still higher than the compatibility of polyethylenic materials (PE5) having a nominal density lower than 0.950 g/ml, these latter having been dissolved during the test.

EXAMPLE 3

Viscosity of the base-oils upon aging in contact with a polyolefin cable component Materials PE1 to PE5 as mentioned above were extruded into tubes having an internal diameter of 1.8 mm and an outer diameter of 2.5 mm. The extrusion line was set at a speed of 150 m/min, the temperature of the melt at the exit from the extruder was at about 190° C. Four cooling vessels (5 m each, for a total cooling length of about 20 m) were used, with temperature decreasing from about 30° C. in the first, about 25° C. in the second one, about 20° C. in the third one and about 15° C. in the last one.

TABLE 6

Density and cristallinity of extruded tubes

| Material | PE1 | PE2 | PE3 | PE4 | PE5 |
| --- | --- | --- | --- | --- | --- |
| Density (g/ml) | 0.944 | 0.944 | 0.945 | 0.945 | 0.938 |
| % of cristallinity (DSC) | 63 | 64 | 66 | 67 | 58 |

The above table 6 lists the characteristics (density and cristallinity percentage) of the obtained tubes. As mentioned previously (see also table 1), such values measured on the extruded components at a relatively high speed are generally slightly lower than the nominal ones given for the raw material or measured on the material slowly cooled.

Lengths of about 25 m of the obtained buffer tubes were filled with the following base-oils MX 2106® (Mixoil-Enichem Augusta), Nesbase 2006® (Nynas), Nyflex 810® (Nynas), and maintained at a temperature of 85° C. for 7 or for 15 days, thus allowing the measurement of viscosity of the base oil in contact with the different extruded materials after 7 and after 15 days. The viscosity was determined with a Brookfield Digital Rheometer Mod. DV-III with a spindle SC4-29 (speed 250 rpm, temperature of 25° C.).

TABLE 7

Viscosity of base-oils in contact with extruded polyethylenic tubes upon aging

| | PE1 | PE2 | PE3 | PE4 | PE5 |
| --- | --- | --- | --- | --- | --- |
| MX 2106 | | | | | |
| Initial viscosity mPas | 55 | 55 | 55 | 55 | 55 |
| Viscosity after 7 days aging | 68 | 71 | 70 | 62 | 121 |
| Viscosity after 15 days aging | 80 | 88 | 85 | 68 | 161 |
| NesBase 2006 | | | | | |
| Initial viscosity (mPas) | 55 | 55 | 55 | 55 | 55 |
| Viscosity after 7 days aging | 75 | 78 | 78 | 69 | 130 |
| Viscosity after 15 days aging | 95 | 96 | 97 | 82 | 141 |

TABLE 7-continued

Viscosity of base-oils in contact with extruded polyethylenic tubes upon aging

| | PE1 | PE2 | PE3 | PE4 | PE5 |
| --- | --- | --- | --- | --- | --- |
| Nyflex 810 | | | | | |
| Initial viscosity (mPas) | 70 | 70 | 70 | 70 | 70 |
| Viscosity after 7 days aging | 193 | 180 | 180 | 109 | 270 |
| Viscosity after 15 days aging | 238 | 200 | 197 | 128 | 429 |

The above table 7 shows the results of the test. As apparent from said table, when the base oils are contacted with a tube made from material PE5, for which a density lower than 0.940 g/ml has been measured, their viscosity becomes substantially higher than the viscosity of the same oils contacted with those materials for which a density higher than 0.940 g/ml has been measured.

In addition, from the results of table 7, it can be observed that a cable component according to the present invention shows a particularly improved compatibility when contacted with an internal polyolefin base oil (MX 2106®)

EXAMPLE 4

Viscosity of the filling composition and mechanical properties of the polyolefin material upon aging of a filled buffer tube In order to evaluate the changes in the viscosity of the filling compositions and in the mechanical properties of the polyethylenic material in contact with such filling material, some materials have been extruded in the form of buffer tubes containing the following filling compositions:

FC1: LA444®, a polyalphaolefin-based composition commercialized by HUBER, having a viscosity of about 55 Pas; and FC2: an internal polyolefin based composition comprising about 91% (w/w) of MX 2106 (Mixoil), about 8.5% of Kraton G 1702 (Shell) and about 0.5% of antioxidant, having a viscosity of about 92 Pas.

The above viscosities are measured by means of a viscometer Rheomat 115 Contraves with a concentric cylinder configuration at a shear rate of 1.56 sec$^{-1}$ at 25° C.

The extruding conditions of the buffer tubes were as above indicated. In addition, during extrusion of the buffer tube, 4 optical fibers were inserted into the tube being extruded, while the filling composition was fed into the tube at a temperature of about 85° C.

The obtained buffer tubes were then aged at a temperature of 85° C. according to the following methodology.

A 10 meters length filled tube was placed into an oven at 85° C. (one piece for each measure). After the predetermined aging period, the tube was removed from the oven and allowed to cool at room temperature. The filling composition was then spilled out from the tube and the relevant measures of viscosity (of the filling composition) and modulus (of the polyethylenic material) were carried out at 25° C. and 50% of relative humidity.

Generally an aging of about 150 days under the above conditions corresponds to an aging of about 20 years under operative conditions.

Tables 8 and 9 show the variation of the tensile modulus of the polyethylenic materials and of the viscosity of filling compositions FC1 and FC2, respectively, upon aging. As for the polyethylenic material, the value and percentage variation of the tensile modulus is given after 120 days aging, as this is generally the test period for determining the suitability of the materials for cable components. As for the filling compositions, the viscosity value is given after 180 days aging.

The starting value of the tensile modulus of the polyethylenic materials forming the buffer tubes was measured on a 60 mm length piece of an empty tube manufactured as above (without filling material), using a Instron mod. 4501 dynamometer, with a load cell of 1 kN, according to the following procedure.

Two metallic rods (about 20 mm length) were inserted at each end of the tube to avoid the tube crash between the dynamometer grips. The two ends of the tube were then inserted into the dynamometer grips, which grips were set at an initial distance of 25 mm from each other. The grips were then moved apart from each other at a speed rate of 25 mm/min. The tensile modulus was determined by using the Instron Series IX Materials Testing System software.

The so obtained values are the initial values of tensile modulus as reported in table 8 and 9.

The same methodology was applied to determine the tensile modulus of the polymeric material of the filled tubes after aging.

The viscosity of the filling compositions after aging inside the buffer tubes were measured using the above viscometer Rheomat 115 Contraves under the same conditions.

TABLE 8

Variation of the tensile modulus of the polyethylenic materials in contact with polyolefin oil based filling compositions, upon aging

| | PE1 | PE2 | PE3 | PE5 |
|---|---|---|---|---|
| Difference between initial tensile modulus and tensile modulus measured after aging in FC1 for 120 days at 85° C. (%) | −26 | −24 | −26 | −35 |
| Difference between initial tensile modulus and tensile modulus measured after aging in FC2 for 120 days at 85° C. (%) | −22 | −17 | −23 | −30 |

TABLE 9

Variation of the viscosity of filling compositions in contact with polyethylenic buffer tubes

| | PE1 | PE2 | PE3 | PE5 |
|---|---|---|---|---|
| Difference between initial viscosity of FC1 and viscosity of FC1 after 180 days aging at 85° C. (%) | 73 | 66 | 82 | 105 |
| Difference between initial viscosity of FC2 and viscosity of FC2 after 180 days aging at 85° C. (%) | 33 | 35 | 29 | 50 |

As it can be appreciated from the results shown in tables 8 and 9, material PE5 (having a nominal density lower than 0.950 g/ml and a density in the finished cable component of less than 0.940 g/ml) shows a higher reduction in the tensile modulus value upon aging, with respect to the other tested materials.

In addition, the increase of the viscosity of the filling composition in contact therewith is generally higher with respect to the increase observed for the other materials.

According to the data shown in tables 8 and 9, better results can be obtained, both in terms of mechanical properties of the polyolefin material and in terms of viscosity of the filling composition, if a cable component according to the present invention is placed in contact with an internal polyolefin oil based composition.

Buffer tubes made of material PE4 and PE6 (i.e materials having a melt flow index of about 7 and of about 5.5, respectively), were also manufactured as above.

However, after only 45 days of aging, all the tested buffer tubes made of such materials showed heavy crackings phenomena with breakage of the tube and the test was thus interrupted. The appearance of such crackings would suggest that materials PE4 and PE6 show a reduced compatibility upon aging with the polyolefin based filling compositions.

EXAMPLE 5

Processability of the materials

As mentioned above in the description, the applicant has observed that among the polyolefin materials having a nominal density higher than about 0.950 g/ml, those having a predetermined relationship between the MFI and the shear sensitivity are particularly preferred, in the specific as regards to the processability of the materials.

In table 10 the values of melt flow index and shear sensitivity of the materials are reported together with observations about the quality of the extruded buffer tubes.

TABLE 10

Characteristics of the employed polyethylenes

| Material | PE1 | PE2 | PE3 | PE4 | PE5 | PE6 | PE7 | PE8 | PE9 |
|---|---|---|---|---|---|---|---|---|---|
| $MFI_A$ (190° C., 2.16 kg) (g/10 min) | 0.17 | 0.23 | 0.61 | 6.9 | 0.77 | 5.5 | 2.8 | 7.5 | 0.9 |
| $MFI_B$ (190° C., 21.6 kg) (g/10 min) | 16 | 25 | 49 | 180 | 64 | 138 | 70 | n.d. | 25 |
| $MFI_B/MFI_A$ | 94 | 109 | 80 | 26 | 83 | 25 | 25 | n.d. | 28 |
| Remarks on processability at line speed of 150 m/min (if not otherwise indicated) | OK | OK | OK | OK | OK | Good | (*) | OK | (**) |

Notes:
MFI were measured according to ASTM method D1238
n.d. = value not detectable: the $MFI_B$ of the material is not detectable (higher than 900 g/10 min) due to the extremely low viscosity of the material.
(*) = Difficult to extrude above 100 m/min
() = Difficult to extrude above 15 m/min Based on the above experimental data, the applicant have found that a relationship can be established between the melt flow index and the shear sensitivity of materials for a speed rate of the extrusion line of about 150 m/min. Said relationship, graphically represented by the curve of FIG. 5**, can be roughly approximated to the following formula:

$$SS = -22 \, Ln(MFI) + 66$$

wherein MFI (expressed in g/10 min) is the melt flow index of the material at 190° C. and 2.16 kg (i.e. measured at a temperature of 190° C. and a weight of 2.16 kg, according to ASTM method D1238) and SS is the shear sensitivity of the material, which is the ratio between the MFI at 190° C. and 21.6 kg and the MFI at 190° C. and 2.16 kg.

As it can be appreciated by FIG. 5, the materials showing preferred processability properties (PE1–PE6 and PE8) lie with a good approximation on or above the illustrated curve, while other materials lie, more or less, outside said curve.

In particular, PE7 and PE9 show insufficient processability properties, due to the low value of the shear sensitivity in combination with the low value of MFI; the relatively narrow molecular weight distribution and the relatively high molecular of the polymer cause the viscosity of the melt to be too high for the high shear rates associated with the high line speeds.

It should also be noted that although materials PE4 and PE6 show relatively good processability performances at the high rate line speeds, their use should preferably be avoided in view of the negative results of the aging test shown in Example 4.

In addition, PE8, although showing also good processability performances, has a density lower than the desired 0.940 g/ml and thus shows poor compatibility with the filling compositions.

What is claimed is:

1. Optical fiber cable, comprising a buffer tube comprising at least one optical fiber housed therein, said buffer tube being made from a polyolefin material wherein said polyolefin material forming said buffer tube has a density of at least 0.940 g/ml or higher, measured according to ASTM standard D792, on the material which has been cooled in water at 15° C. after being heated up to its melting temperature, and a melt flow index at 190° C. and 2.16 kg lower than about 3 g/10min, the ratio between the melt flow index at 190° C. and 21.6 kg and the melt flow index at 190° C. and 2.16 kg of said polyolefin material being higher than about 40.

2. Optical fiber cable according to claim 1 wherein said melt flow index is lower than about 2 g/10 mm.

3. Optical fiber cable according to claim 1 wherein said ratio is higher than about 70.

4. Optical fiber cable according to claim 1 wherein said buffer tube is in contact with a waterblocking filling composition.

5. Optical fiber cable according to claim 1 wherein said buffer tube is made from polyethylene.

6. Optical fiber cable according to claim 1 wherein said at least one fiber is immersed into a waterblocking filling composition in contact with said buffer tube.

7. Optical fiber cable according to claim 6, wherein said waterblocking filling composition comprises a polyolefin base oil.

8. Optical fiber cable according to claim 7, wherein said polyolefin base oil is an internal polyolefin.

9. Optical fiber cable according to claim 1 wherein the polyolefin material forming said buffer tube has a density of 0.950 g/ml or higher when subjected to a natural cooling from its molten state.

10. Optical fiber cable according to claim 9 wherein said polyolefin material shows a solubility in n-heptane at 85° C. after 24 hours of less than about 2%.

11. Optical fiber cable according to claim 9 wherein said polyolefin material shows a weight increase of less than 10%, preferably of less than about 8% when contacted at 85°C. with a polyolefinic oil having a kinematic viscosity of about 30 cSt at 40°C., a viscosity index of about 128 and a weight average molecular weight in the range from approximately 400 Dalton to approximately 600 Dalton.

* * * * *

UNITED STATES PATENT AND TRADEMARK OFFICE
CERTIFICATE OF CORRECTION

PATENT NO. : 6,658,185 B2
DATED : December 2, 2003
INVENTOR(S) : Claudio Bosisio et al.

It is certified that error appears in the above-identified patent and that said Letters Patent is hereby corrected as shown below:

<u>Column 20,</u>
Line 4, "3 g/lomin," should read -- 3 g/10min, --.
Line 9, "2 g/10 mm." should read -- 2 g/10min. --.

Signed and Sealed this

Seventh Day of September, 2004

JON W. DUDAS
*Director of the United States Patent and Trademark Office*